United States Patent
Nam et al.

(10) Patent No.: US 7,889,693 B2
(45) Date of Patent: Feb. 15, 2011

(54) METHOD AND SYSTEM FOR PROVIDING QOS IN BROADBAND CONVERGENCE NETWORK DEPLOYING MOBILE IP

(75) Inventors: Hyun Soon Nam, Daejeon (KR); Da Hye Choi, Chungcheongnam-do (KR); You Hyeon Jeong, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 741 days.

(21) Appl. No.: 11/904,529

(22) Filed: Sep. 27, 2007

(65) Prior Publication Data

US 2008/0130574 A1 Jun. 5, 2008

(30) Foreign Application Priority Data

Sep. 29, 2006 (KR) .................. 10-2006-0096426

(51) Int. Cl.
*H04W 4/00* (2009.01)
(52) U.S. Cl. .................. 370/328; 370/338; 370/401; 370/468
(58) Field of Classification Search .................. None
See application file for complete search history.

(56) References Cited

U.S. PATENT DOCUMENTS

| | | | |
|---|---|---|---|
| 6,661,780 B2 | 12/2003 | Li | |
| 7,272,651 B1 * | 9/2007 | Bolding et al. | 709/227 |
| 2003/0108015 A1 * | 6/2003 | Li | 370/338 |
| 2004/0125797 A1 * | 7/2004 | Raisanen | 370/389 |
| 2005/0030918 A1 * | 2/2005 | Motegi et al. | 370/328 |
| 2005/0041584 A1 * | 2/2005 | Lau et al. | 370/235 |
| 2005/0073953 A1 * | 4/2005 | Kekki | 370/230 |
| 2006/0111111 A1 | 5/2006 | Ovadia | |
| 2006/0234716 A1 * | 10/2006 | Vesterinen et al. | 455/450 |

FOREIGN PATENT DOCUMENTS

| | | |
|---|---|---|
| EP | 1 032 179 A1 | 8/2000 |
| JP | 2006-245691 | 9/2006 |
| KR | 1020060012953 A | 2/2006 |
| KR | 10-2006-0027919 | 3/2006 |

OTHER PUBLICATIONS

Shou-Chih Lo, "Architecture for Mobility and QoS Support in All-IP Wireless Networks", IEEE Journal on Selected Areas in Communications, vol. 22, No. 4, May 2004, 0733-87-871604/2004 IEEE, pp. 691-705.

* cited by examiner

*Primary Examiner*—Bob A Phunkulh
(74) *Attorney, Agent, or Firm*—Blakely, Sokoloff, Taylor & Zafman LLP

(57) ABSTRACT

Provided is a method and system for providing a QoS in a broadband convergence network deploying a mobile IP. In the method, a service and policy is defined at a first network design stage for guaranteeing the QoS of the broadband convergence network. QoS parameters corresponding to the defined service and policy are reflected in a DSCP field corresponding to the defined service. The DSCP field and the QoS parameters are applied to an access router in a management network. Accordingly, the QoS can be guaranteed to be suitable for the service and policy and a seamless handover guaranteeing the QoS can be provided.

12 Claims, 7 Drawing Sheets

METHOD AND SYSTEM FOR PROVIDING QOS IN BROADBAND CONVERGENCE NETWORK DEPLOYING MOBILE IP

CLAIM OF PRIORITY

This application claims the benefit of Korean Patent Application No. 10-2006-96426 filed on Sep. 29, 2006 in the Korean Intellectual Property Office, the disclosure of which is incorporated herein by reference.

BACKGROUND OF THE INVENTION

1. Field of the Invention

The present invention relates to a method and system for providing a quality of service (QoS), and more particularly, to a method and system for providing a QoS in a broadband convergence network (BcN) deploying a mobile Internet protocol (IP).

This work was supported by the IT R&D program of MIC/IITA[2005-S-097-02, Development of BcN Integrated Network Control and QoS/TE Management Technology]

2. Description of the Related Art

In general, a broadband convergence network (BcN) is a network for providing wired/wireless convergence and broadcast convergence on the basis of a layer 3.

The BcN uses a mobile IP scheme as one of the supported wireless network management schemes and this scheme is divided into mobile IPv4 and IPv6. The mobile IP scheme enables session-based authentication and resource management by using resource admission control function (RACF) recommended by the international telecommunication union-telecom (ITU-T).

The RACF provides a pull mode and a push mode. The pull mode can be divided into an operation of processing resources and authentication using a session management protocol such as a session initiation protocol (SIP) and an operation of reserving resources along a mobile IP data path using a path-coupled QoS signaling protocol such as a resource reservation protocol (RSVP). The push mode can be divided into an operation of processing resources and authentication using a session management protocol and an operation of reflecting the processed results in the network.

Meanwhile, a conventional technology for establishing a QoS session between a corresponding node and a mobile node uses a resource reservation protocol (RSVP) as a QoS signaling protocol. The RSVP is intended to reinforce the current Internet architecture by supporting a QoS flow.

In the conventional art, the RSVP provides a receiver QoS request to all router nodes along a traffic path to maintain association (path/reservation status) and to establish a resource reservation in each router.

However, this conventional art may cause a connection interrupt due to re-operation of the RSVP at a handover.

SUMMARY OF THE INVENTION

The present invention has been made to solve the foregoing problems of the prior art and therefore an aspect of the present invention provides a method for providing a mobile IP QoS in a broadband convergence network by using a DSCP field of a packet.

An aspect of the present invention also provides a method and system for providing a mobile QoS between different service providers in a broadband convergence network by using a modified DSCP field during an authentication process or an IP address change process.

An aspect of the present invention also provides a QoS providing method and system for providing a seamless handover in a broadband convergence network, in which a centralized resource manager defines a service to be used in the network and a DSCP field corresponding to the service and applies the defined DSCP field to an access network, and an access edge router keeps the QoS by checking the DSCP field of a packet during a handover.

According to an aspect of the present invention, there is provided a method of providing a QoS in a broadband convergence network deploying a mobile IP, the method including: defining a service and policy in a centralized resource manager at a first network design stage; reflecting QoS parameters corresponding to the defined service and policy in a DSCP (DiffServ Code Point) field corresponding to the defined service; and applying the DSCP field and the QoS parameters to an access router in a management network.

According to another aspect of the present invention, there is provided a method for providing a QoS in a broadband convergence network deploying a mobile IP using a mobile terminal, the method including: determining a DSCP (DiffServ Code Point) field of a target access network, when a mobile terminal in an access network connected to the broadband convergence network is handed over to the target access network; performing authentication of the handover in an authentication server and then transmitting the determined DSCP field to the mobile terminal simultaneously with transmission of the new IP information when the authentication server acquires new IP information for the target access network; marking the transmitted DSCP field in a corresponding field of a header in the mobile terminal; and generating at the mobile terminal a TX packet containing the header marked with the transmitted DSCP field for guaranteeing the QoS through the customer access network.

According to still another aspect of the present invention, there is provided a method for providing a QoS in a broadband convergence network deploying a mobile IP, the method including: transmitting a service and policy suitable for corresponding 5-tuple information of IPv4 or IPv6 to a router of a target access network; determining, at the centralized resource manager, to re-mark a DSCP (DiffServ Code Point) field marked in a header of a TX packet as a new DSCP field based on the corresponding 5-tuple information and reflecting the re-marked DSCP field to the router of the target access network.

According to a further aspect of the present invention, there is provided a system for providing a QoS in a broadband convergence network deploying a mobile IP, the system including: a centralized resource manager including a service/policy manager for defining a service and policy to be applied to a number of access networks at a first network design stage and managing the defined service and policy and a DSCP (DiffServ Code Point) filed corresponding to the defined service, and service/policy reflector for reflecting QoS parameters corresponding to the defined service and policy in the DSCP field and applying the reflected DSCP field to the routers of the access networks; and a router including a service/policy executor for guaranteeing a bandwidth suitable for the QoS parameters for each session on the basis of the reflected DSCP field and, when a first session exceeding link capacity is entered, dropping the first session.

According to a still further aspect of the present invention, there is provided a system for providing a QoS in a broadband convergence network deploying a mobile IP, the system including: a centralized resource manager for defining a service and policy to be applied to a number of access networks at a first network design stage and reflecting QoS parameters corresponding to the defined service and policy in a DSCP (DiffServ Code Point) field corresponding to the defined service to apply the reflected DSCP field to routers of the access networks; the routers of the access networks for guaranteeing a bandwidth suitable for the QoS parameters for each session on the basis of the applied DSCP field and, when a first session exceeding link capacity is entered, dropping the first session; and an authentication server for performing authentication of a mobile terminal to transmit new IP information to the mobile terminal when the mobile terminal is handed over from a home network to a target access network and detecting a DSCP field applied to the target access network to transmit the detected DSCP field to the mobile terminal simultaneously with the transmission of the new IP information.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENT

Certain embodiments of the present invention will now be described in detail with reference to the accompanying drawings. In order to clearly describe the present invention, the descriptions of well-known functions and elements are omitted.

Also, like numeral references denote like elements in the accompanying drawings.

Embodiments of the present invention are intended to provide a method and system for providing a QoS in a broadband convergence network deploying a mobile IP, which is applicable to an ITU-T RACF push mode and can provide a seamless handover for the mobile IP of the broadband convergence network by using a DiffServ Code Point (DSCP) field of a packet.

Figure 1:
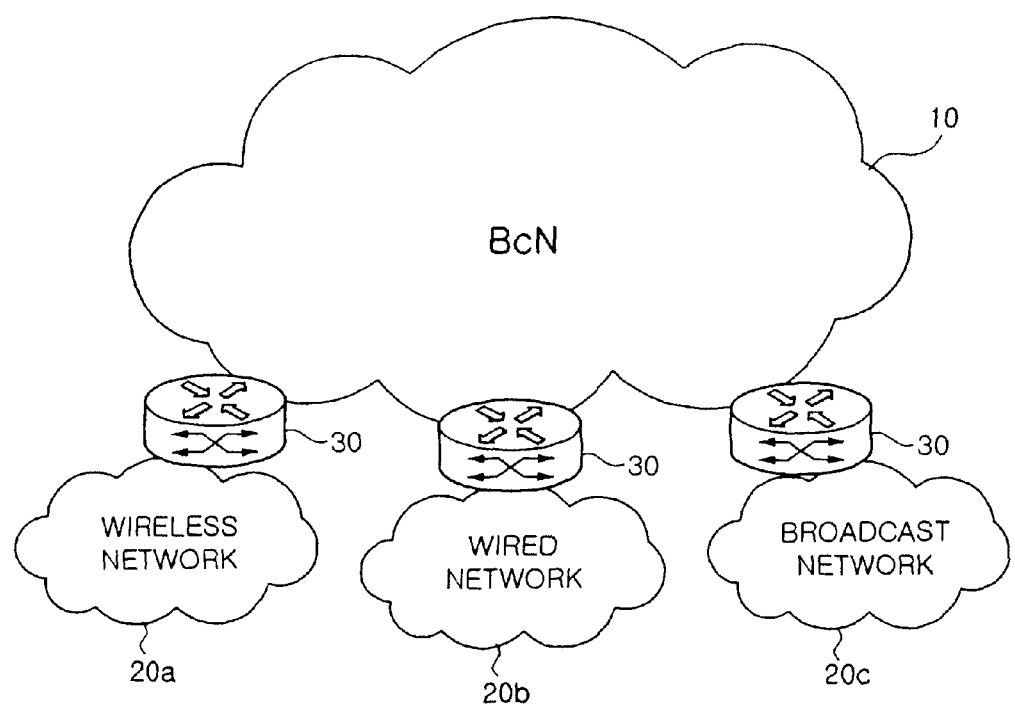
FIG. 1 is a network diagram illustrating a variety of access networks of a general broadband convergence network.

FIG. 1 is a network diagram illustrating a variety of access networks of a general broadband convergence network.

Referring to FIG. 1, a broadband convergence network (BcN) 10 is a network for providing wired/wireless convergence and broadcast convergence on the basis of a layer 3 IP, and a variety of access networks 20 such as a wireless network 20a, a wired network 20b, and a broadcast network 20c are accessible to the broadband convergence network 10.

Each of the access networks 20 includes mobile terminals that access the broadband convergence network 10 via a corresponding access router 30.

A system for providing a QoS in the broadband convergence network will now be described in detail with reference to the accompanying drawings.

Figure 2:
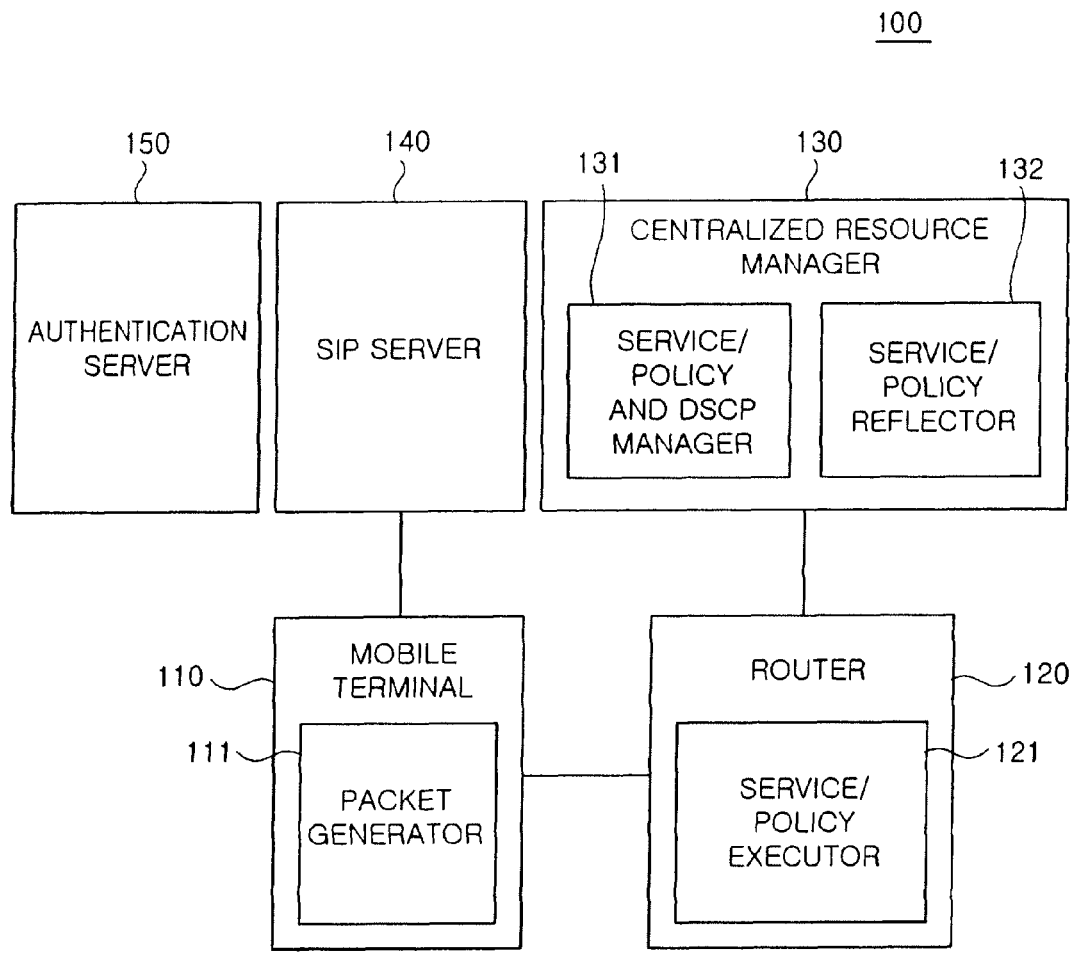
FIG. 2 is a block diagram of a system for providing a QoS for a mobile IP in a broadband convergence network according to an embodiment of the present invention.

FIG. 2 is a block diagram of a system for providing a QoS for a mobile IP in the broadband convergence network according to an embodiment of the present invention.

Referring to FIG. 2, the QoS providing system 100 includes a mobile terminal 110 accessing the access network 20, an access router 120 connected to the broadband convergence network 10, a centralized resource manager 130, a SIP server 140, and an authentication server 150.

In here, the centralized resource manager 130 includes a service/policy manager 131 for defining a service and policy to be applied to a number of access networks at a first network design stage and managing the defined service and policy and a DSCP (DiffServ Code Point) field corresponding to the defined service, and a service/policy reflector 132 for reflecting QoS parameters corresponding to the defined service and policy in the DSCP field and applying the reflected DSCP field to the access router 120.

The access router 120 includes a service/policy executor 121 for guaranteeing a bandwidth suitable for the QoS parameters for each session on the basis of the reflected DSCP field and, when a first session exceeding link capacity is entered, dropping the first session.

The authentication server 150 performs authentication of the mobile terminal 110 to transmit new IP information to the mobile 110 terminal when the mobile terminal 110 is handed over from a home network to a target access network and detects a DSCP field applied to the target access network to transmit the detected DSCP field to the mobile terminal 110 simultaneously with the transmission of the new IP information.

In the QoS providing system 100 includes the service/policy executor 121 included in the access router 120 and the service/policy and DSCP manager 131 and the service/policy reflector 132 included in the centralized resource manager 130 to distribute functions to provide an IP QoS using the DSCP field.

The DSCP field may be an IPv6 traffic class field or a TOS field in an IPv4 IP header. The IPv4 TOS field or the IPv6 class field is used to distinguish and indicate how an access router transfers an IP packet through an intermediate router.

The DSCP field does not use the lower 2 bits but the upper 6 bits of the TOS field. A value allocated to the upper 6 bits is used to determine a packet transfer scheme such as buffer allocation and a packet transfer order (i.e., packet scheduling) in a router through which packets pass, which may be rewritten while a packet is transferred to another domain (i.e., access network).

Figure 3:
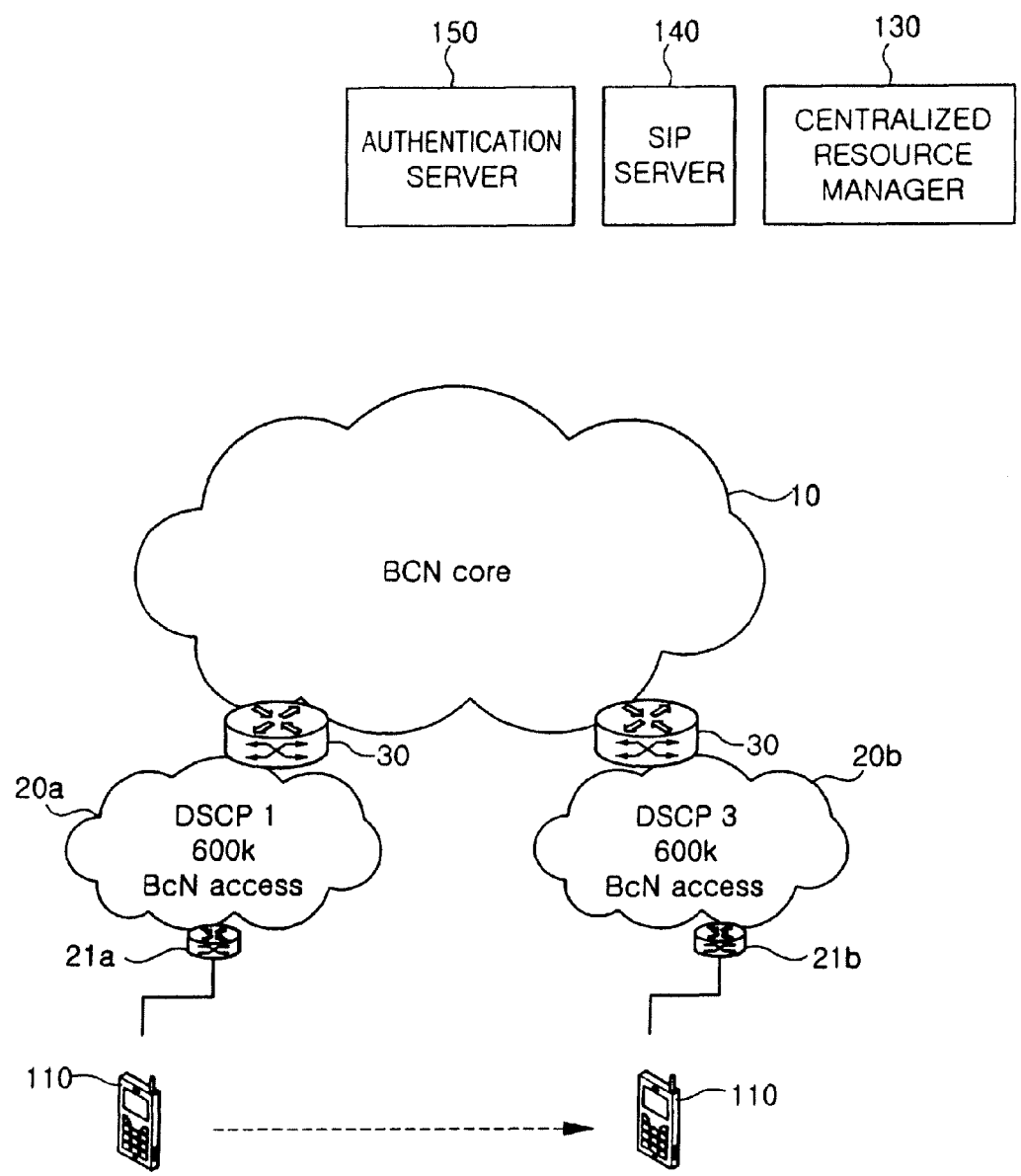
FIG. 3 is a network diagram illustrating a handover of a mobile terminal in a broadband convergence network according to an embodiment of the present invention.

When a mobile terminal 110 moves from a current access network into another access network (i.e., a mobile network of another service provider) in the broadband convergence network including the QoS providing system and thus a handover occurs, a seamless QoS must be provided for the mobile terminal. The architecture of the broadband convergence network for the handover is illustrated in FIG. 3.

In the handover, a QoS can also be provided for another access network 20b by applying a modified DSCP field when changing an authentication process or an IP address in conjunction with the authentication server 150 and the SIP server. A detailed method for this will be described later with reference to FIG. 5.

A method for providing a QoS in the QoS providing system according to an embodiment of the present invention will now be described in detail with reference to the accompanying drawings. The QoS providing method according to an embodiment of the present invention includes a service/policy definition process performed for a first network design stage, a resource allocation process performed for a call admission stage through an SIP server, and a process for a handover.

In here, the resource allocation process performed for the first network design stage through the SIP server is well known in the art (specified in the standard ITU-T and IETF), and thus its detailed description will be omitted for conciseness.

The remaining processes will be described in detail with reference to the accompanying drawings.

Figure 4:
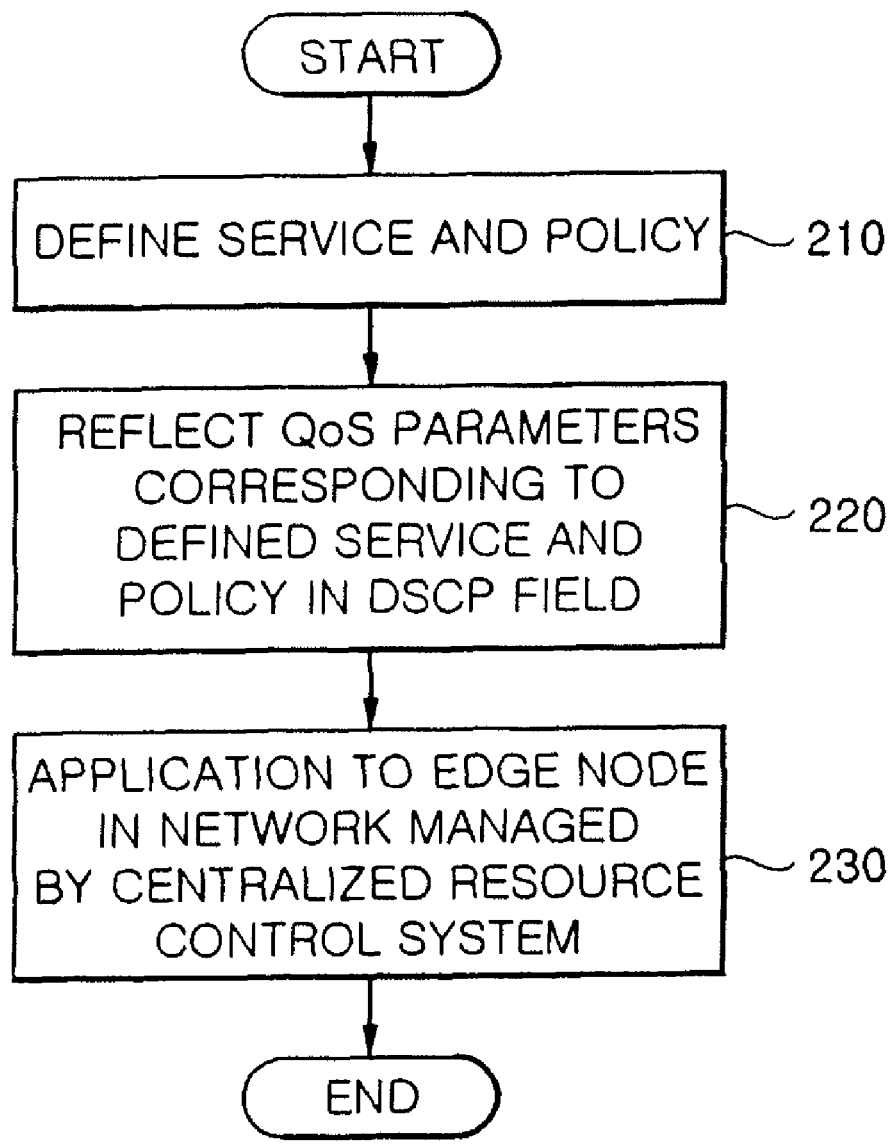
FIG. 4 is a flowchart illustrating a service/policy definition process performed for a first network design stage in a broadband convergence network according to an embodiment of the present invention.

FIG. 4 is a flowchart illustrating a service/policy definition process performed for a first network design stage in the QoS providing system according to an embodiment of the present invention.

Referring to FIG. 4, the centralized resource manager 130 uses the service/policy manager 131 to define a service and a policy to be applied to a network, in 210. At this point, a service for each service provider is defined if there is an access network of another service provider.

In 220, the centralized resource manager 130 reflects QoS parameters corresponding to the defined service and policy in a DSCP field.

In 230, the service/policy reflector 132 of the centralized resource manager 130 transfers the reflected QoS parameters and corresponding DSCP field to the service/policy executor 121 of the access router 120 to apply the service and policy and corresponding DSCP to the access router 120.

Using a DSCP field of a received packet, the service/policy executor 121 guarantees a bandwidth suitable for the QoS parameters for each session and, when the first session exceeding link capacity is entered, drops the session, thereby preventing congestion in a preset session.

The process for the handover will now be described in detail with reference to the accompanying drawings.

Figure 5:
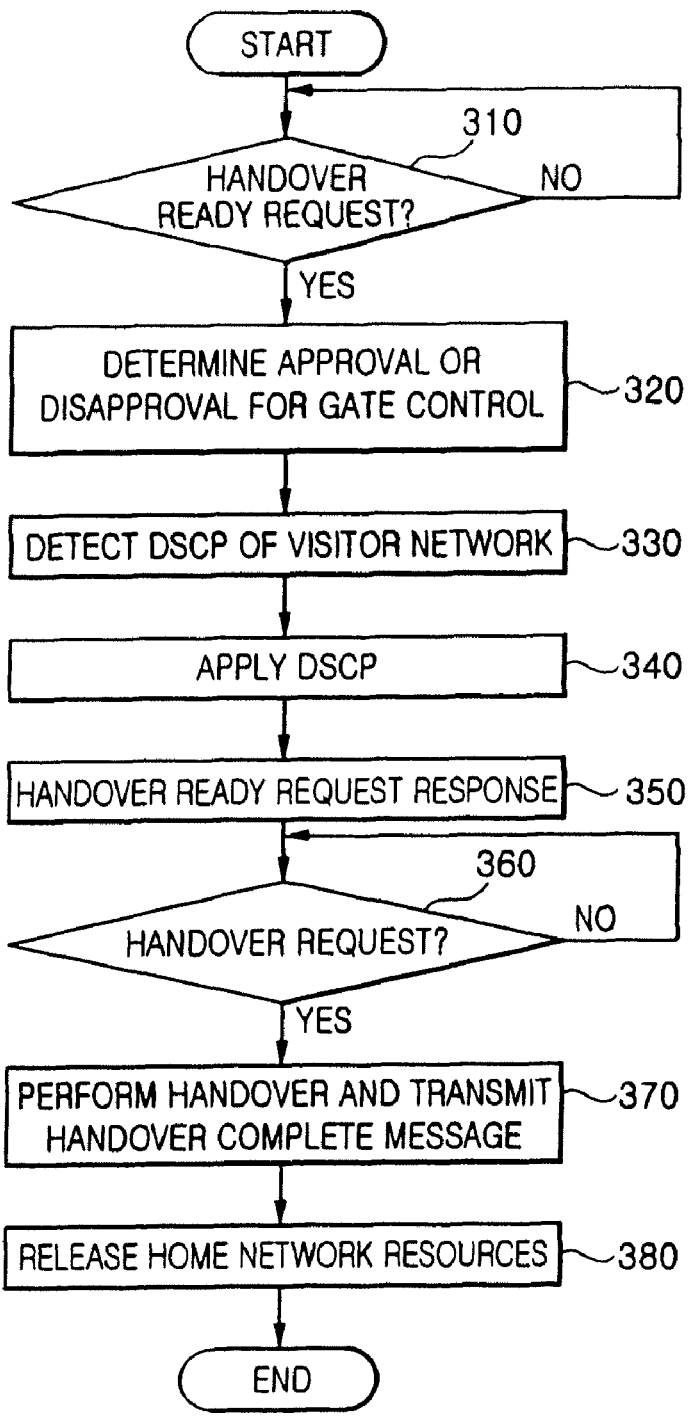
FIG. 5 is a flowchart illustrating a process for a handover in a broadband convergence network according to an embodiment of the present invention.

FIG. 5 is a flowchart illustrating a process for a handover in the QoS providing system according to an embodiment of the present invention.

Referring to FIG. 5, when the mobile terminal 110 moves and thus a handover occurs, the mobile terminal 110 generates a handover ready request message.

In 310, the authentication server 150 determines if the handover ready request message is received from the mobile terminal 110. If so, the process proceeds to step 320; and if not, step 310 is repeated.

In 320, the authentication server 150 determines approval or disapproval for gate control.

In 330, the authentication server 150 detects a DSCP field value corresponding to a target access network 20*b* defined by the centralized resource manager 130.

In 340, the authentication server 150 applies the detected DSCP field value to a corresponding device and the mobile terminal 110.

At this point, when an access network 20*a* of the broadband convergence network (BcN) supports the IPv4, the authentication server 150 acquires a new IP address in conjunction with a DHCP server (not illustrated) and re-marks a TOS field of a packet for the acquired IP address as a new DSCP field corresponding to the target access network 20*b*. On the other hand, when the current access network 20*a* of the broadband convergence network (BcN) supports the IPv6, the authentication server 150 re-marks a traffic class field of the corresponding IP address as a new DSCP field corresponding to the target access network 20*b*.

In 305, the authentication server 150 transmits a response message corresponding to the handover ready request to the mobile terminal 110.

In 360, the authentication server 150 determines if a handover request message is received from the mobile terminal 110. If so, the process proceeds to step 370; and if not, step 360 is repeated.

In 370, the authentication server 150 performs a handover and transmits a handover complete message to the mobile terminal 110.

In 380, the authentication server 150 releases the resources of the previous access network 20*a* (i.e., the home network). Thereafter, the process is ended.

In these processes, two mechanisms are needed to satisfy a QoS by applying the above DSCP field to the network. The first mechanism is that a mobile terminal 110 marks the DSCP field during an authentication process and the second mechanism is that access routers 120*a* and 120*b* re-marks the DSCP field by classifying given IP based on 5-tuple information of a packet.

Figure 6:
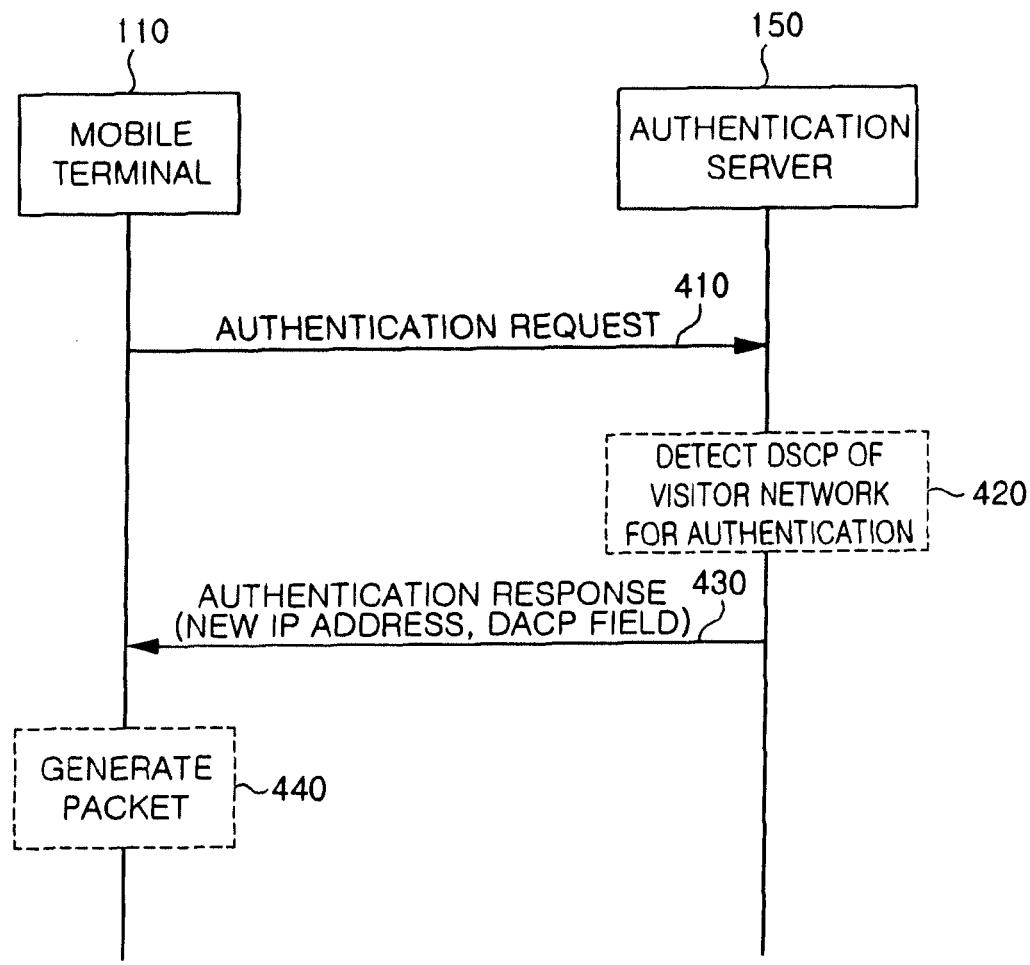
FIG. 6 is a flow diagram illustrating a process for marking a DSCP field in a mobile terminal during authentication process according to the first mechanism of the present invention.

FIG. 6 is a flowchart illustrating a process for marking a DSCP field in a mobile terminal during an authentication process according to the first mechanism of the present invention.

Referring to FIG. 6, when a mobile terminal 110 requests an authentication to hand over to a target access network in 410, the authentication server 150 performs the authentication and determines a DSCP (DiffServ Code Point) field of the target access network in 420.

In 430, the authentication server 150 obtains a new IP address for the target access network and transmits the new IP address together with the determined DSCP field to the mobile terminal 110.

In 440, the mobile terminal 110 marks a value of the transmitted DSCP field in a corresponding field of a header and generates a TX packet containing the header marked with the transmitted DSCP field to guarantee the QoS through the target access network.

In the case that the broadband convergence network (BcN) supports the IPv6, after authentication, the authentication server 150 sends a DSCP field of the target access network to the mobile terminal 110 so that the mobile terminal 110 can mark a value of the DSCP field.

Figure 7:
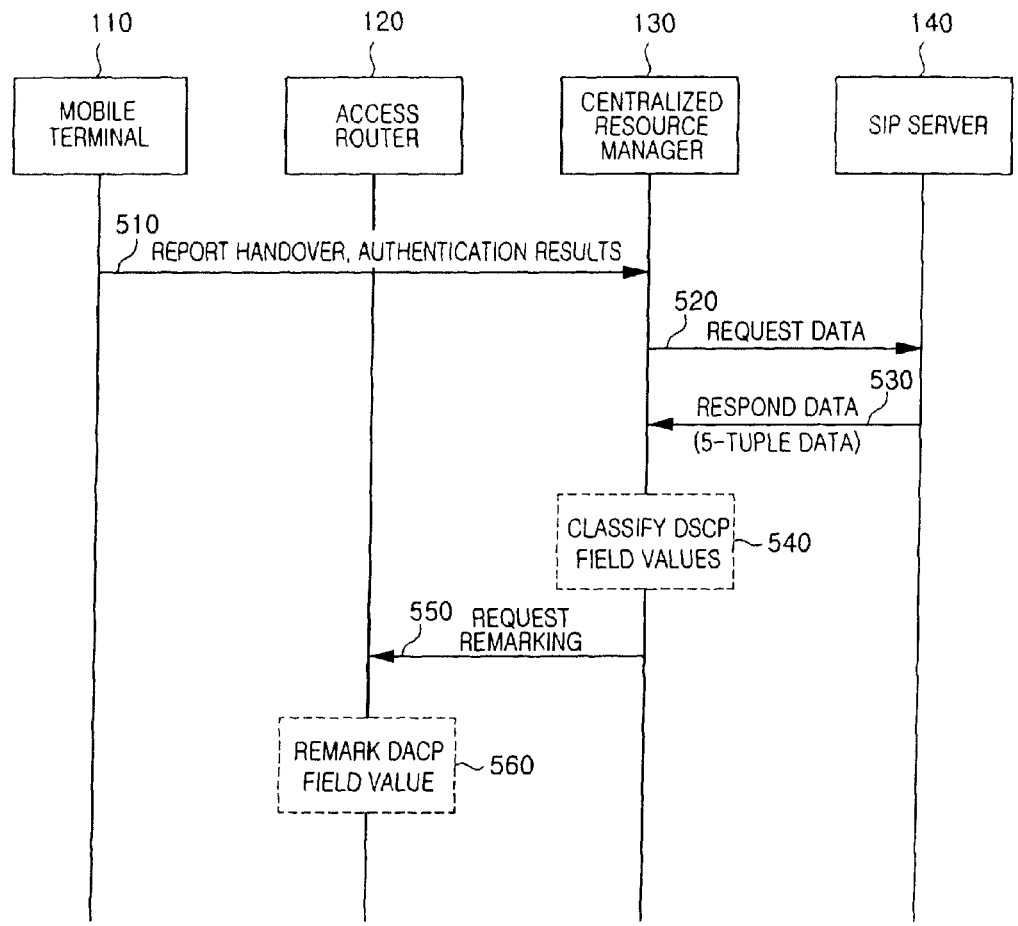
FIG. 7 is a flow diagram illustrating a process for re-marking a DSCP field by classifying IPs given to edge devices according to the second mechanism of the present invention.

FIG. 7 is a flowchart illustrating a process for re-marking a DSCP field by classifying IPs given to access routers 120*a* and 120*b* according to the second mechanism of the present invention.

Referring to FIG. 7, when a mobile terminal 110 reports the result of handover and authentication in 510, a centralized resource manager 130 classifies DSCP field values on the basis of 5-tuple information (e.g., a source IP address, a destination IP address, a source port number, a destination port number, and a protocol number) obtained in conjunction with the SIP server 140 in 520 to 540.

In 550, the centralized resource manager 130 configures access router 120 to re-mark DSCP field of a packet based on 5-tuple information gathered from 520 to 540.

In 560, the access router 120 re-marks the DSCP field on the basis of the 5-tuple information received from the mobile terminal 110.

A description will be given of an exemplary case where the mobile terminal 110 moves from the access network 20*a* capable of guaranteeing a QoS of 600 Kbps for DSCP=1 into the access network 20*b* capable of guaranteeing a QoS of 600 Kbps for DSCP=3.

Referring back to FIG. 3, in the first mechanism, the mobile terminal 110 is ensured guaranteed QoS after handover since the mobile terminal generates a packet with suitable DSCP filed value for access network 20*b*. In the second mechanism, the centralized resource manager 130 sets the access router 120 of the access network 20*b* to re-mark the DSCP from 1 to 3 on the basis of the 5-tuple information given to the mobile terminal 110. Accordingly, the access router 120 performs this operation, thereby guaranteeing the QoS.

In this way, the embodiments of the present invention guarantees the QoS using the above two mechanisms, thereby making it possible to provide a seamless handover.

As described above, the present invention uses DSCP filed to provide seamless handover guaranteeing a QoS. Accordingly, the QoS can be guaranteed to be suitable for a service and policy and thus the network design can be standardized.

In addition, a DSCP field can be applied according to the conditions of the mobile IP network and an overhead due to re-operation of a path-coupled QoS signaling protocol for a handover stage can be reduced. Moreover, the QoS can also be guaranteed in the access network of another service provider by amending (re-marking) the DSCP field during the authentication process and the IP address change process.

While the present invention has been shown and described in connection with the preferred embodiments, it will be apparent to those skilled in the art that modifications and variations can be made without departing from the spirit and scope of the invention as defined by the appended claims.

What is claimed is:

1. A method of providing a QoS in a broadband convergence network deploying a mobile IP, the method comprising:
    defining a service and policy in a centralized resource manager at a first network design stage;
    reflecting QoS parameters corresponding to the defined service and policy in a DSCP (DiffServ Code Point) field corresponding to the defined service;
    applying the DSCP field and the QoS parameters to an access router in a management network;
    guaranteeing a bandwidth suitable for the QoS parameters for each session on the basis of a received DSCP field in the access router; and
    when a first session exceeding link capacity is entered, dropping the first session.

2. A method for providing a QoS in a broadband convergence network deploying a mobile IP using a mobile terminal, the method comprising:
    determining a DSCP (DiffServ Code Point) field of a target access network, when a mobile terminal in an access network connected to the broadband convergence network is handed over to the target access network;
    performing authentication of the handover in an authentication server and then transmitting the determined DSCP field to the mobile terminal simultaneously with transmission of the new IP information when the authentication server acquires new IP information for the target access network;
    marking the transmitted DSCP field in a corresponding field of a header in the mobile terminal; and
    generating at the mobile terminal a TX packet containing the header marked with the transmitted DSCP field for guaranteeing the QoS through the customer access network.

3. The method according to claim 2, wherein the determined DSCP field of the target access network has same QoS level as the DSCP of a home network.

4. A method for providing a QoS in a broadband convergence network deploying a mobile IP, the method comprising:
    transmitting a service and policy suitable for corresponding 5-tuple information of IPv4 or IPv6 to a router of a target access network; and
    determining, at the centralized resource manager, to re-mark a DSCP (DiffServ Code Point) field marked in a header of a TX packet as a new DSCP field based on the corresponding 5-tuple information and reflecting the re-marked DSCP field to the router of the target access network.

5. The method according to claim 4, wherein the DSCP field is configured to reflect QoS parameters corresponding to the service and policy defined at a first network design stage and is applied to an access router in the broadband convergence network.

6. The method according to claim 4, wherein the DSCP field of the customer access network has the same QoS as a home network.

7. A system for providing a QoS in a broadband convergence network deploying a mobile IP, the system comprising:
    a centralized resource manager including a service/policy manager for defining a service and policy to be applied to a number of access networks at a first network design stage and managing the defined service and policy and a DSCP (DiffServ Code Point) field corresponding to the defined service, and service/policy reflector for reflecting QoS parameters corresponding to the defined service and policy in the DSCP field and applying the reflected DSCP field to the routers of the access networks; and
    a router including a service/policy executor for guaranteeing a bandwidth suitable for the QoS parameters for each session on the basis of the reflected DSCP field and, when a first session exceeding link capacity is entered, dropping the first session.

8. A system for providing a QoS in a broadband convergence network deploying a mobile IP, the system comprising:
    a centralized resource manager for defining a service and policy to be applied to a number of access networks at a first network design stage and reflecting QoS parameters corresponding to the defined service and policy in a DSCP (DiffServ Code Point) field corresponding to the defined service to apply the reflected DSCP field to routers of the access networks;
    the routers of the access networks for guaranteeing a bandwidth suitable for the QoS parameters for each session on the basis of the applied DSCP field and, when a first session exceeding link capacity is entered, dropping the first session; and
    an authentication server for performing authentication of a mobile terminal to transmit new IP information to the mobile terminal when the mobile terminal is handed over from a home network to a target access network and detecting a DSCP field applied to the target access network to transmit the detected DSCP field to the mobile terminal simultaneously with the transmission of the new IP information.

9. The system according to claim 8, wherein the mobile terminal marks the received DSCP field in a corresponding field in a header to generate a TX packet for guaranteeing the QoS through the target access network.

10. The system according to claim 8, wherein the centralized resource manager transmits corresponding 5-tuple information to the target access network when acquiring the authentication or new IP information.

11. The system according to claim 10, wherein the centralized resource manager determines to re-remark the DSCP field on the basis of the 5-tuple information and sets the router of the access network to enforce the remarking.

12. The system according to claim 8, wherein the DSCP field applied to the target access network detected by the authentication server has the same QoS level as the current access network.

* * * * *